(No Model.)

H. MOLT.
BOX CLOSURE.

No. 475,135. Patented May 17, 1892.

Witnesses.
Robert Everett.
J. A. Rutherford.

Inventor.
Heinrich Molt.
By
James L. Norris.
Atty

UNITED STATES PATENT OFFICE.

HEINRICH MOLT, OF WESTERRADE, GERMANY.

BOX-CLOSURE.

SPECIFICATION forming part of Letters Patent No. 475,135, dated May 17, 1892.

Application filed December 7, 1891. Serial No. 414,296. (No model.)

*To all whom it may concern:*

Be it known that I, HEINRICH MOLT, a citizen of Germany, residing at Westerrade, Province of Schleswig-Holstein, Germany, temporarily residing at Garbeck, near Segeberg, in the Province of Schleswig-Holstein, Germany, have invented certain new and useful Improvements in Box-Closures; and I do hereby declare the following to be a full, clear, and exact description of the invention, such as will enable others skilled in the art to which it appertains to make and use the same.

My invention relates to certain improvements in covers for boxes and jars or other vessels in which a tight cover hermetically closed, or practically so, is essential.

It is the purpose of my invention to provide simple means whereby this result may be accomplished, the invention being adapted to cans, jars, or boxes of sheet metal or other suitable material for holding perishable articles or material which deteriorates from atmospheric action or evaporation—such as condensed milk, honey, desiccated fish, preserves, and many other substances.

It is one purpose of my invention to provide a cover which shall be readily attachable to and detachable from any vessel with but slight and inexpensive change in the construction of said vessel.

The invention consists in the several novel features of construction and new combinations of parts hereinafter fully set forth, and then more particularly pointed out and defined in the claims which conclude this specification.

To enable others to understand and to make and use my said invention, I will proceed to describe the same in detail, reference being made for such purpose to the accompanying drawings, in which—

Figure 1:
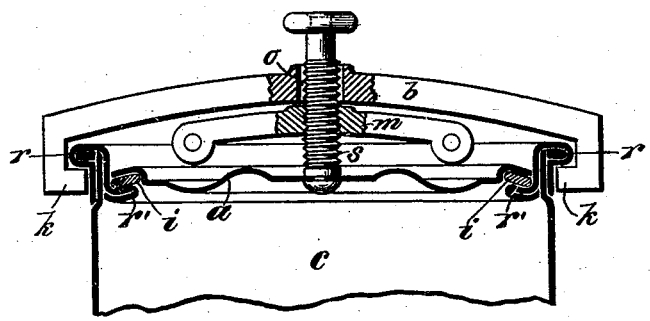
Figure 3:
Figure 2:
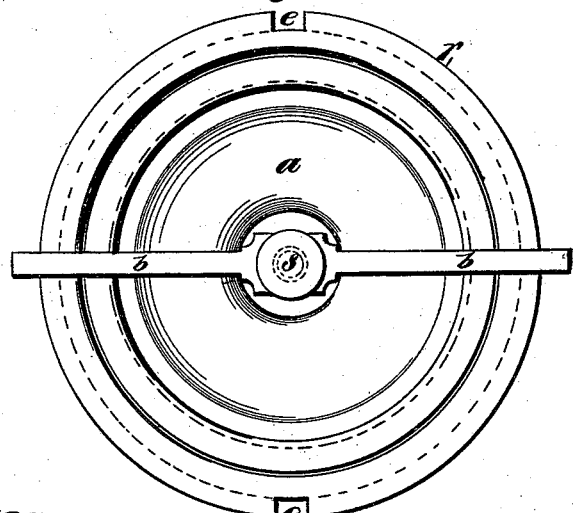

Figure 1 is a central vertical section of the upper portion of a vessel provided with said invention. Fig. 2 is a plan view of the parts as shown in Fig. 1. Fig. 3 is a detail plan view of the operating-nut removed from the cover.

In the said drawings, the reference-letter *a* denotes the cover of the vessel, said cover being preferably, but not necessarily, made of sheet metal and of circular or other suitable form. It may be manufactured, when made of metal, by stamping it up in dies, and by imparting the well-known form which is represented in transverse section by the ogee curve, Fig. 1, it will have all necessary strength and elasticity. The marginal portion of said cover I prefer to raise somewhat, as shown in Fig. 1, forming thereby a kind of circular rabbet, in which is placed a packing-ring *i* of rubber, felt, paraffined paper, or other suitable substance.

The reference-letter *c* designates the vessel or box, which I form in any usual manner and of any suitable material, its open mouth being provided with a circumferential outwardly-projecting lip or flange *r*. From the inner face, a little below the edge, is formed or attached a circular inwardly-projecting lip *r'*, which is usually of such inclination as to lie substantially parallel with the raised edge of the cover.

When the vessel *c* is made of sheet metal, the lip *r* and the interior lip *r'* may be made in one piece of sheet metal, the outer lip *r* being bent over a reinforcing-ring and having a vertical or hanging strip which lies closely around the upper or open end of the vessel, which may be inset, in order that the strip hanging from the lip *r* may be flush with the exterior of the vessel. From the inner edge of the lip *r*, also, a strip of metal depends vertically and at its lower edge is bent inwardly and then bent upon itself to form the lip *r'*. The raw edge of the lower half of the lip lies close to the inner face of the vessel, to which it may be soldered or brazed. The outer and inner vertical portions receive the margin of the vessel between them, as seen in Fig. 1.

Centrally attached to and rising from the cover *a* is a screw *s*, upon which turns a nut *m*, having opposite arms for convenience in operating it. Above this nut *m* and between it and a head or enlargement upon the upper end of the screw *s* is a yoke *b*, having a central opening *o*, through which the screw passes loosely. The yoke is of such length as to span the top of the vessel *c* diametrically, its extremities passing beyond the outer edge of the lip *r* and then extending downward below said lip, lugs *k* being projected inward far enough to lie beneath and engage with said outer lip. The latter is provided with opposite notches or openings e to allow the lugs k to pass.

By the construction described the cover and its clamping device and yoke are all removable from the vessel or box and are all connected together, so that no portion or member thereof is liable to be lost or mislaid.

What I claim is—

1. A cover for a box or containing-vessel, having an interior lip and a circumferential notched lip or flange, said cover consisting of a plate having a central rising screw, a nut turning upon said screw, and a yoke having an opening through which the screw passes loosely, the ends of said yoke having lugs adapted to lie beneath the outer notched flange, substantially as described.

2. The combination, with a vessel or box having an interior lip and an external notched lip or flange, of a cover adapted to enter the mouth of said vessel and rest on the inner lip, the margin of said cover being provided with a rabbet to receive a packing-ring, a nut turning upon a screw rising from said cover, and a yoke arranged above the nut and having an opening to receive said screw, the ends of the yoke having lugs which lie beneath the outer flange or lip on the vessel, substantially as described.

In testimony whereof I affix my signature in presence of two witnesses.

HEINRICH MOLT.

Witnesses:
 EDUARD FLÖRZER,
 GOTTF GRONING.